US011265150B2

(12) United States Patent
Ren et al.

(10) Patent No.: US 11,265,150 B2
(45) Date of Patent: *Mar. 1, 2022

(54) GLOBAL IDENTIFICATION OF DEVICES BASED ON DESIGNATED IPV6 ADDRESS

(71) Applicant: Verizon Patent and Licensing Inc., Basking Ridge, NJ (US)

(72) Inventors: Dahai Ren, Lincoln, MA (US); Ming Chen, Bedford, MA (US); Feng Li, Lexington, MA (US); Dongxu Shan, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/844,340

(22) Filed: Apr. 9, 2020

(65) Prior Publication Data

US 2020/0235918 A1 Jul. 23, 2020

Related U.S. Application Data

(63) Continuation of application No. 15/901,202, filed on Feb. 21, 2018, now Pat. No. 10,652,012.

(51) Int. Cl.
*H04L 9/08* (2006.01)
*H04L 29/12* (2006.01)
(Continued)

(52) U.S. Cl.
CPC ........ *H04L 9/0816* (2013.01); *H04L 61/2007* (2013.01); *H04L 61/2046* (2013.01);
(Continued)

(58) Field of Classification Search
CPC ............... H04L 9/0816; H04L 61/2046; H04L 61/2061; H04L 61/2007; H04L 61/6059; H04L 63/0876
See application file for complete search history.

(56) References Cited

U.S. PATENT DOCUMENTS 9,813,374 B1 11/2017 Magerramov et al.
2003/0078035 A1 4/2003 Sheha et al.
(Continued)

OTHER PUBLICATIONS

Narten, T. et al. Privacy Extensions for Stateless Address Autoconfiguration in IPv6. RFC 4941. Sep. 2007. (Year: 2007).*
(Continued)

*Primary Examiner* — Robert B Leung

(57) ABSTRACT

A method, a device, and a non-transitory storage medium are described in which a global identification service is provided. The service includes a selection of an Internet Protocol version 6 (IPv6) address to an end device. The service encrypts a unique identifier of the end device with an encryption key to generate an IPv6 address. The service verifies whether the IPv6 address is an IPv6 address allocated to or owned by a service provider. When the IPv6 address is an allocated or owned IPv6 address, the IPv6 address is assigned to the end device. When the IPv6 address is not an allocated or owned IPv6 address, the service selects another encryption key until a suitable IPv6 address is generated. Subsequent to an assignment of the IPv6 address, a network uses the IPv6 address as a globally unique identifier for the end device.

20 Claims, 12 Drawing Sheets

GENERATES AN IPv6
ADDRESS BASED ON THE
IDENTIFIER AND THE
ENCRYPTION KEY
215

DEVICE
110

DETERMINES WHETHER
THE IPv6 ADDRESS IS
ALLOCATED TO AND/OR
OWNED BY A SERVICE
PROVIDER
220

(51) Int. Cl.
  *H04L 29/06* (2006.01)
  *H04L 61/5007* (2022.01)
  *H04L 61/5061* (2022.01)
  *H04L 61/5046* (2022.01)
  *H04L 101/659* (2022.01)

(52) U.S. Cl.
  CPC ...... *H04L 61/2061* (2013.01); *H04L 61/6059* (2013.01); *H04L 63/0876* (2013.01)

(56) References Cited

U.S. PATENT DOCUMENTS

| | | | |
|---|---|---|---|
| 2003/0149790 A1* | 8/2003 | Hwang | H04L 29/12358 709/245 |
| 2004/0037316 A1* | 2/2004 | Choi | H04L 29/12358 370/466 |
| 2008/0304457 A1 | 12/2008 | Thubert et al. | |
| 2010/0008507 A1 | 1/2010 | Galante et al. | |
| 2010/0260338 A1 | 10/2010 | Haddad et al. | |
| 2013/0046864 A1 | 2/2013 | Behringer et al. | |
| 2017/0264600 A1 | 9/2017 | Froelicher et al. | |
| 2018/0288015 A1* | 10/2018 | Kudaraya | H04L 61/2038 |

OTHER PUBLICATIONS

P. Pongpaibool, P. Sotthivirat, S. I. Kitisin and C. Srisathapornphat, "Fast Duplicate Address Detection for Mobile IPv6," 2007 15th IEEE International Conference on Networks, 2007, pp. 224-229, doi: 10.1109/ICON.2007.4444090. (Year: 2007).*

S. Thomson, T. Narten, and T. Jinmei, "IPv6 Stateless Address Autoconfiguration", RFC 4862, Sep. 2007. (Year: 2007).*

"Cryptographically Generated Addresses (CGA)", RFC 3972. Mar. 2005. (Year: 2005).

Guangxue, et al., "A quick CGA generation method", (May 2010). In 2010 2nd International Conference on Future Computer and Communication (vol. 1, pp. V1-V769). IEEE. (Year: 2010).

* cited by examiner

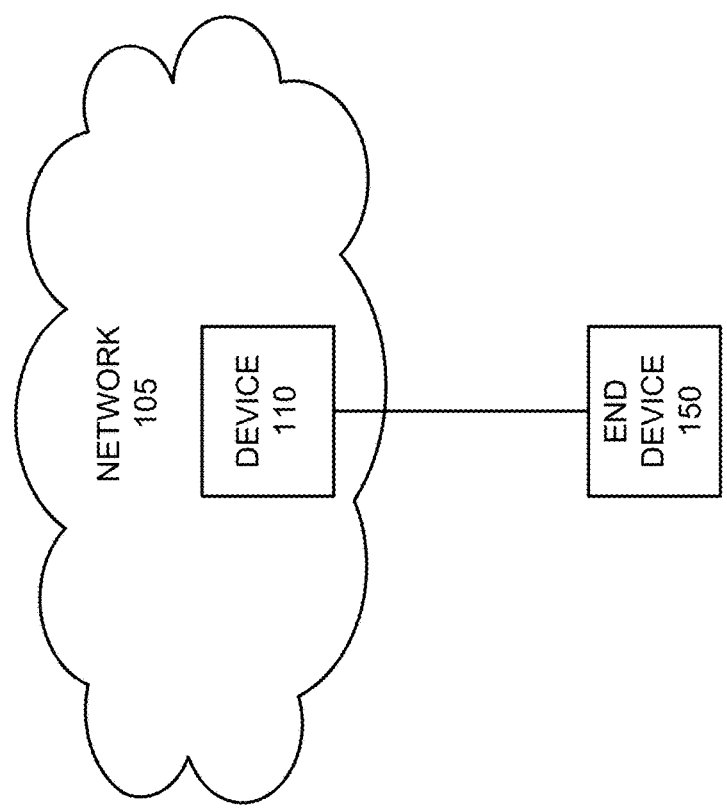

OBTAINS IDENTIFIER OF END DEVICE
205

DEVICE
110

SELECTS AN ENCRYPTION KEY
210

GENERATES AN IPv6 ADDRESS BASED ON THE IDENTIFIER AND THE ENCRYPTION KEY
215

DEVICE
110

DETERMINES WHETHER THE IPv6 ADDRESS IS ALLOCATED TO AND/OR OWNED BY A SERVICE PROVIDER
220

Fig. 2B

STORES THE IDENTIFIER, THE ENCRYPTION KEY, AND THE IPv6 ADDRESS
225

DEVICE
110

SELECTS ANOTHER ENCRYPTION KEY
230

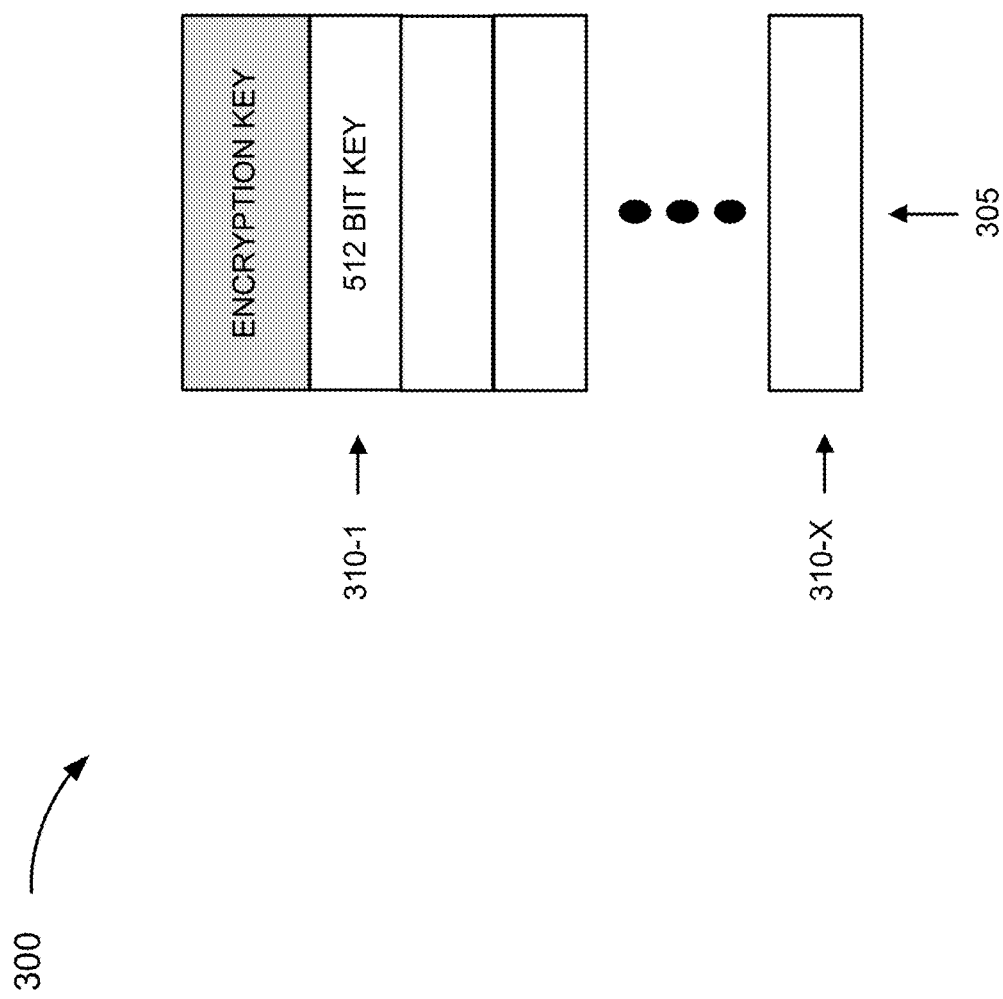

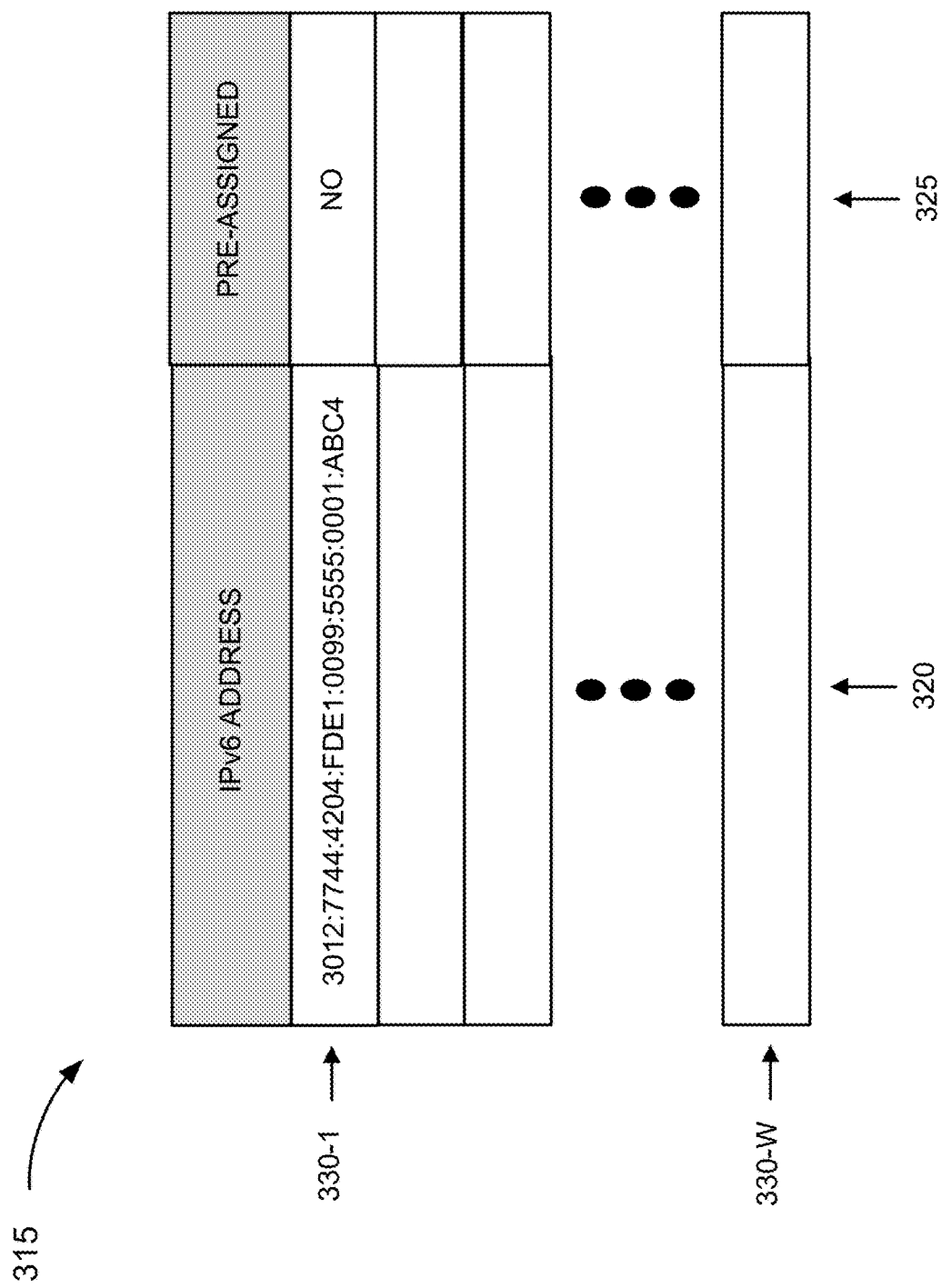

GLOBAL IDENTIFICATION OF DEVICES BASED ON DESIGNATED IPV6 ADDRESS

CROSS REFERENCE TO RELATED APPLICATION

This patent application is a continuation of U.S. patent application Ser. No. 15/901,202, entitled "GLOBAL IDENTIFICATION OF DEVICES BASED ON DESIGNATED IPv6 ADDRESS" and filed on Feb. 21, 2018, the disclosure of which is incorporated herein by reference in its entirety.

BACKGROUND

Typically, a network provides a network service to an end device based on an identifier of the end device. For example, the end device may communicate the identifier to a network device to allow the network to authenticate and register the end device.

BRIEF DESCRIPTION OF THE DRAWINGS

FIG. 1 is a diagram illustrating an exemplary environment in which an exemplary embodiment of a global identification service may be implemented;

FIGS. 2A-2C are diagrams illustrating an exemplary process of an exemplary embodiment of the global identification service;

FIGS. 3A-3D are diagrams illustrating exemplary information that may used by an exemplary embodiment of the global identification service;

DETAILED DESCRIPTION OF PREFERRED EMBODIMENTS

Figure 2A:
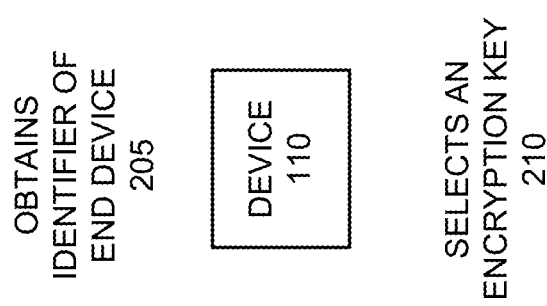

The following detailed description refers to the accompanying drawings. The same reference numbers in different drawings may identify the same or similar elements. Also, the following detailed description does not limit the invention.

The number of end devices (e.g., Internet of Things (IoTs), user devices, etc.) has been growing exponentially during the past several years. As a result, a network receives a very large volume of requests, and it is a challenge to recognize the identity of the end device and manage their requests accordingly. Existing identifiers of end devices may not be unique and/or may require continuously longer bit-lengths in order to accommodate the exponential growth of end devices.

It is also difficult to track the identity of an end device through layers of network components because a device hardware identifier is not viewed by the network as a global identification of the end device. Additionally, even when the device hardware identifier is included in messages to and from the end device, within the network, etc., typically the device hardware identifier has to be included in a predefined field of the message, which also adds byte size to the message. Accordingly, this approach can increase usage of network resources by network devices (e.g., a processor, a memory, etc.) and communication links (e.g., bandwidth, etc.) of a network, as well as increase usage of end device resources (e.g., a processor, a memory, etc.). Further, any increase in usage of resources may lead to undesirable network conditions and states (e.g., congestion, access barring, handover procedures, cell reselection procedures, etc.).

Internet Protocol version 6 (IPv6) uses a 128-bit address, which allows for $2^{128}$ unique IP addresses. A network service provider may be allocated or own a portion of these IPv6 addresses for operation.

According to exemplary embodiments, a global identification service is provided. According to an exemplary embodiment, a set of encryption keys is generated and stored. According to an exemplary implementation, the key size may be $2^8$ (256) bits. According to other exemplary implementations, the key size may be smaller or larger.

According to an exemplary embodiment, the global identification service includes a verification and pre-assignment service of an IPv6 address. According to exemplary embodiments, a network device obtains an identifier of an end device. The network device encrypts the identifier of an end device into an IPv6 address based on an encryption key. According to an exemplary embodiment, the network device compares the IPv6 address to a pool of IPv6 addresses. According to an exemplary implementation, the comparison may include determining whether the IPv6 address matches one of the IPv6 addresses of the pool that has not already be verified and pre-assigned. According to another exemplary implementation, the comparison may include determining that the IPv6 address value falls within a range of IPv6 address values (e.g., between a largest IPv6 address value and a smallest IPv6 address value) associated with the pool. The pool of IPv6 addresses may be IPv6 addresses allocated to or owned by a service provider for use.

When the network device determines that the IPv6 address is an IPv6 that has not already been assigned and is an IPv6 address that can be assigned (e.g., owned, allocated to, etc.), the network device may determine that there are no collision issues pertaining to an assignment of the IPv6 address to the end device in view of the end device identifier and the encryption key. Based on this determination, the network device may generate and/or select an encryption key identifier, which identifies the encryption key used. The network device may transmit or make available the encryption key identifier to the end device. The end device may store the encryption key identifier.

The network device may store global identification information, which may include the end device identifier, the encryption key, the encryption key identifier, the IPv6 address, and data indicating that the IPv6 address has been verified (without collision issues) and assigned. For example, the global identification information may be stored in a database or another type of data storage structure.

On the other hand, when the network device determines that the IPv6 address is an IPv6 address that has already been assigned and/or is an IPv6 that cannot be assigned (e.g., not owned, allocated to, etc.), the network device selects another encryption key, and the verification and pre-assignment process is repeated.

According to another exemplary embodiment, the global identification service includes an on-demand assignment of an IPv6 address service. According to an exemplary embodiment, as previously described, the end device is assigned an encryption key identifier, which identifies an encryption key. The end device stores the encryption key identifier. According to an exemplary embodiment, the end device transmits a request for an IP address to a network device. The request may include an end device identifier and the encryption key identifier.

According to an exemplary embodiment, the network device uses the encryption key identifier to select the encryption key. In response to the selection, the network device uses the encryption key to encrypt the end device identifier and produce the IPv6 address. In this way, the network device does not have to search through a large data repository (e.g., possibly millions of records or more) to assign an IPv6 address. Rather, the network device may access and use a data repository of limited size, which correlates encryption key identifiers with encryption keys. The network device transmits a response, which includes the assigned IPv6 address, to the end device.

According to exemplary embodiments, various network devices of a network may globally identify the end device when the end device accesses and uses the network based on its assigned IPv6 address.

As a result, the global identification service may improve resource utilization (e.g., memory, processor, communication interface, communication links, etc.) in relation to an access network, a core network, and/or other types of networks, as well as improve resource utilization of an end device. For example, the end device and/or network devices may reduce the size of messages and processing of such messages because an identifier of the end device may not be included in such messages. Further, the IPv6 addresses can be used more readily as a global identifier of an end device because the IPv6 address is unique and is carried in messages transmitted and received in a network. In this regard, the IPv6 address may serve as a network address and a unique identifier, and may be applied to a wide variety of network-related services (e.g., authentication, authorization, charging, service and application layers of a network, subscription enforcement pertaining to data usage, etc.). Also, the assignment of the IPv6 address may be a permanent assignment to the end device. As a result, for example, various network devices (e.g., a home subscriber server (HSS), a unified data management (UDM) function, a Web server, etc.) may store the IPv6 address and/or use the IPv6 address as a globally unique identifier for end device 150.

FIG. 1 is a diagram illustrating an exemplary environment 100 in which an exemplary embodiment of the global identification service may be implemented. As illustrated, environment 100 includes a network 105. Network 105 includes a device 110. As further illustrated, environment 100 includes an end device 150. The number, the type, and the arrangement of devices are exemplary. For example, device 110 may be implemented as multiple devices. Additionally, or alternatively, for example, device 110 may be implemented as customer premise equipment or a network device. According to various exemplary embodiments, device 110 may be implemented according to a centralized computing architecture, a distributed computing architecture, a cloud computing architecture (e.g., an elastic cloud, a private cloud, a public cloud, etc.), or a web service architecture. Additionally, device 110 may be implemented according to one or multiple network architectures (e.g., a client device, a server device, a peer device, a proxy device, a cloud device, a virtualized function, etc).

Environment 100 includes a communication link between the devices. Environment 100 may be implemented to include a wired, an optical, and/or a wireless communication link. A communicative connection between devices via a communication link may be direct or indirect. For example, an indirect communicative connection may involve an intermediary device and/or an intermediary network not illustrated in FIG. 1. The number and the arrangement of communication links illustrated in environment 100 are exemplary.

Network 105 includes one or multiple networks of one or multiple types and technologies that host the global identification service, as described herein. For example, network 105 may be implemented to include the Internet, the World Wide Web (WWW), a Wide Area Network (WAN), a Metropolitan Area Network (MAN), a private network, a public network, an Internet Protocol (IP) network, a virtual network, a software-defined network (SDN), a wireless network, a wired network, an optical network, an access network, a core network, a cloud network, a packet-switched network, a service provider network, some other type of terrestrial-based network, a customer premises network, a local area network (LAN), or some combination thereof.

According to exemplary embodiments, device 110 includes logic that provides a global identification service. The global identification service may include a verification and pre-assignment service and/or an on-demand assignment service.

According to an exemplary embodiment, device 110 includes logic that provides the verification and pre-assignment service. According to an exemplary implementation, device 110 generates and stores a set of encryption keys. According to another exemplary implementation, device 110 is pre-loaded with a set of encryption keys. Device 110 includes logic that obtains an identifier of end device 150. For example, the identifier may be implemented as a an International Mobile Station Equipment Identity (IMEI), a Mobile Equipment Identifier (MEID), an International Mobile Subscriber Identity (IMSI), an Electronic Serial Number (ESN), a media access control (MAC) address, or other type of string that identifies end device 150 or a component of end device 150 (e.g., a circuit board, a card, or other form of hardware and/or software). According to an exemplary implementation, the identifier of end device 150 is unique (e.g., globally).

Device 110 includes logic that selects one of the encryption keys. For example, device 110 may randomly select or non-randomly select the encryption key from the set of encryption keys. Device 110 uses the selected encryption key to encrypt the identifier and generate an IPv6 address. According to an exemplary embodiment, device 110 may include logic of a public-key (or asymmetric) encryption algorithm (e.g., Rivest-Shamir-Adleman (RSA) cryptosystem, Paillier cryptosystem, elliptic curve techniques, etc.). According to other exemplary embodiments, device 110 may include logic of a private-key (or symmetric) encryption algorithm.

Device 110 determines whether the IPv6 address satisfies a criterion. For example, the criterion may be that the IPv6 address matches an IPv6 address from a pool of IPv6 addresses or is within a range of IPv6 addresses of the pool of IPv6 addresses. Additionally, device 110 determines whether the IPv6 address has not already been pre-assigned to another end device. When device 110 determines that the IPv6 address satisfies the criterion, device 110 may generate and/or select an encryption key identifier, which identifies the encryption key used. Device 110 may transmit or make available the encryption key identifier to end device 150, and end device 150 may store the encryption key identifier for use with the on-demand assignment service, as described herein.

According to an exemplary embodiment, device 110 stores global identification information. The global identification information may include the identifier of end device 150, the encryption key, the encryption key identifier, the IPv6 address, and data indicating that the IPv6 address has been verified and/or pre-assigned. When device 110 determines that the IPv6 address does not satisfy the criterion, device 110 selects another encryption key and repeats the verification and pre-assignment process.

According to an exemplary embodiment, the verification and pre-assignment process may be performed during a subscription process. For example, a service provider may register various IoT devices (e.g., end devices 150) of a customer. During the registration process, device 110 may obtain the identifiers of the IoT devices and provide the verification and pre-assignment service. According to other exemplary embodiments, the verification and pre-assignment process may be performed any time prior to an assignment of an IPv6 address to end device 150.

According to another exemplary embodiment, device 110 includes logic that provides the on-demand assignment service. According to an exemplary embodiment, device 110 may be implemented as a device that assigns an IPv6 address. For example, device 110 may be implemented as customer premise equipment (e.g., a home router, a wireless router, etc.), a device that includes a Dynamic Host Configuration Protocol (DHCP) server, an anchor node (e.g., a packet data network gateway (PGW) of an evolved packet core (EPC) network, a Gateway General Packet Radio Service (GPRS) Support Node (GGSN), a Mobile Agent, etc.), or some other network device/element (e.g., a Session Management Function (SMF) of a 5G core network, etc.).

According to an exemplary embodiment, device 110 includes logic that receives a request for an IP address from end device 150. According to an exemplary implementation, the request message also includes an identifier of end device 150 and an encryption key identifier. According to other exemplary implementations, the identifier and the encryption key identifier may be carried by another and/or separate message.

Device 110 includes logic that performs a lookup using the encryption key identifier. Based on a result of the lookup, device 110 selects an encryption key indicated by the encryption key identifier. Device 110 includes logic that encrypts the identifier of end device 150 using the encryption key, and generates an IPv6 address.

According to an exemplary embodiment, device 110 determines whether the IPv6 address satisfies a criterion. For example, the criterion may be that the IPv6 address matches an IPv6 address from a pool of IPv6 addresses or is within a range of IPv6 addresses of the pool of IPv6 addresses. Additionally, device 110 determines whether the IPv6 address has not already been pre-assigned to another end device. When device 110 determines that the IPv6 address satisfies the criterion, device 110 transmits a response message to end device 150. The response message includes the IPv6 address. When device 110 determines that the IPv6 address does not satisfy the criterion, device 110 selects an unassigned IPv6 from the pool of IPv6 addresses, and transmits a response message to end device 150. The response message includes the IPv6 address.

End device 150 includes a device that has computational and communication capabilities. End device 150 may be implemented as a mobile device, a portable device, or a stationary device. End device 150 may be implemented as a Mobile Broadband device, a Machine Type Communication (MTC) device, an Internet of Things (IoT) device, an enhanced MTC device (eMTC) (also known as Cat-M1), a NarrowBand IoT (NB-IoT) device, a machine-to-machine (M2M) device, a user device, or some other type of end node. By way of further example, end device 150 may be implemented as a smartphone, a personal digital assistant, a tablet, a netbook, a phablet, a wearable device, a set top box, an infotainment system in a vehicle, a vehicle support system, a smart television, a game system, a music playing system, or some other type of user device. According to various exemplary embodiments, end device 150 may be configured to execute various types of software (e.g., applications, programs, etc.). The number and the types of software may vary among end devices 150.

According to an exemplary embodiment, end device 150 includes logic that provides a global identification service. According to an exemplary embodiment, end device 150 may include an agent or a client that provides the global identification service. For example, end device 150 may be configured to receive an encryption key identifier and store the encryption key identifier, as described herein. Additionally, for example, end device 150 may be configured to provide an identifier and the encryption key identifier when requesting an assignment of an IPv6 address, as well as other operations and/or processes, as described herein.

Figure 2C:

FIGS. 2A-2C are diagrams illustrating an exemplary process of the global identification service. According to an exemplary embodiment, device 110 may provide a verification and pre-assignment service in which device 110 may verify and pre-assign an IPv6 address to end device 150. Referring to FIG. 2A, in step 205, device 110 may obtain an identifier of end device 150. For example, according to an exemplary scenario, as a part of a subscription process to the global identification service, an administrator or other user associated with end device 150 may provide the identifier to a network device of the global identification service. Alternatively, end device 150 may transmit the identifier to device 110. In step 210, in response to obtaining the identifier, device 110 may select an encryption key. For example, referring to FIG. 3A, device 110 may store a set of encryption keys. According to this example, device 110 may store global identification service information, which includes the set of encryption keys, in a table, a list, or other suitable data structure or a database. By way of further example, a table 300 includes an encryption key field 305. As further illustrated, table 300 includes records 310-1 through 310-X. Encryption key field 305 may store an encryption key. According to an exemplary implementation, the encryption key may have a length of 512 bits. According to other exemplary implementations, the encryption key may be shorter or longer in bit length (e.g., 256 bits, etc.).

Referring back to FIG. 2A, device 110 may select an encryption key from table 300. The selection of the encryption key may be random or non-random. Referring to FIG. 2B, in step 215, device 110 may generate an IPv6 address based on encrypting the identifier with the selected encryption key. In step 220, in response to generating the IPv6 address, device 110 determines whether the IPv6 address is allocated to and/or owned by a service provider. For example, referring to FIG. 3B, device 110 may store a pool of IPv6 addresses that are allocated to and/or owned by the service provider. According to this example, device 110 may store global identification service information, which includes the pool of IPv6 addresses, in a table, a list, or other suitable data structure or a database. By way of further example, a table 315 includes an IPv6 address field 320 and a pre-assignment field 325. As further illustrated, table 315 includes records 330-1 through 330-W. IPv6 address field 320 may store an IPv6 address. Pre-assignment field 325 may store data indicating whether or not the IPv6 address has been pre-assigned. According to other examples, table 315 may include additional, different, and/or fewer instances of data. For example, an IPv6 address that has already been pre-assigned may be removed from table 315. According to such an exemplary implementation, pre-assignment field 325 may be omitted from table 315.

Referring back to FIG. 2B, device 110 may determine whether the IPv6 address is of the pool of IPv6 addresses stored in table 315. For example, device 110 may determine whether IPv6 address is within a range of IPv6 addresses of the pool, or matches an IPv6 address stored in table 315, and whether the IPv6 address is available or not for pre-assignment. Referring to FIG. 2C, in response to determining the IPv6 address is of the pool of IPv6 addresses stored in table 315, in step 225, device 110 stores global identification service information. For example, referring to FIG. 3C, device 110 may store global identification service information, which includes a correlation or a mapping between an end device identifier, an encryption key, and an IPv6 address, in a table or other suitable data structure or a database. By way of further example, a table 335 includes an end device identifier field 340, an encryption key field 345, and an IPv6 address field 350. As further illustrated, table 335 includes records 355-1 through 355-T that each includes a grouping of fields 340 through 350 that may be correlated.

End device identifier field 340 may store data indicating an identifier of end device 150. As previously described, the identifier may be as an IMEI, an MEID, an IMSI, an ESN, a MAC address, or other type of string that (uniquely) identifies end device 150 or a component of end device 150.

Encryption key field 345 may store an encryption key. According to an exemplary implementation, the encryption key may have a length of 256 bits. According to other exemplary implementations, the encryption key may be shorter or longer in bit length (e.g., 512 bits, etc.). IPv6 address field 350 may store an IPv6 address. For example, the IPv6 address may be generated based on the correlated identifier, which is stored in end device identifier field 340, and the correlated encryption key, which is stored in encryption key field 345. The IPv6 address may serve as both a network address and a globally unique identifier for end device 150 in the network.

Referring back to FIG. 2C, in response to determining that the IPv6 address is not of the IPv6 addresses stored in table 315, in step 230, device 110 may select another encryption key. For example, the exemplary process may repeat beginning at step 210, as previously described. This process may iteratively continue until an IPv6 address is determined to be of the pool of IPv6 addresses stored in table 315.

Figure 3C:
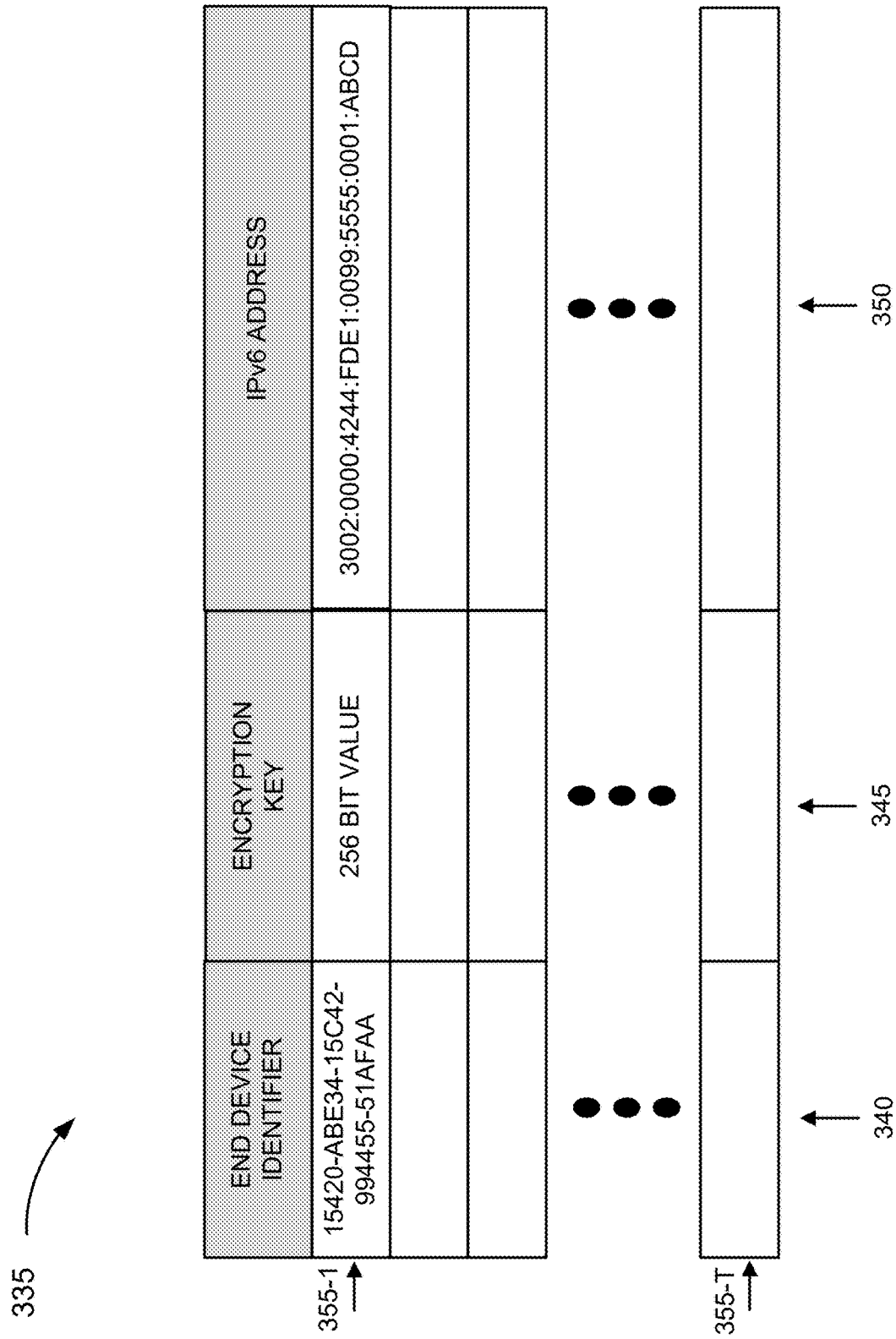

Although FIGS. 2A-2C illustrate an exemplary process of the global identification service, according to other exemplary embodiments, the process may include additional, different, and/or fewer steps, than those illustrated and described herein. Additionally, the global identification service information illustrated and described in relation to FIGS. 3A-3C are exemplary. According to other exemplary implementations, the global identification service information may include additional, fewer, and/or different instances of data. Additionally, or alternatively, the values illustrated and described for each field of the global identification service information are exemplary. Additionally, or alternatively, according to other exemplary embodiments, two or more exemplary tables, as illustrated, may be combined.

Figure 4:
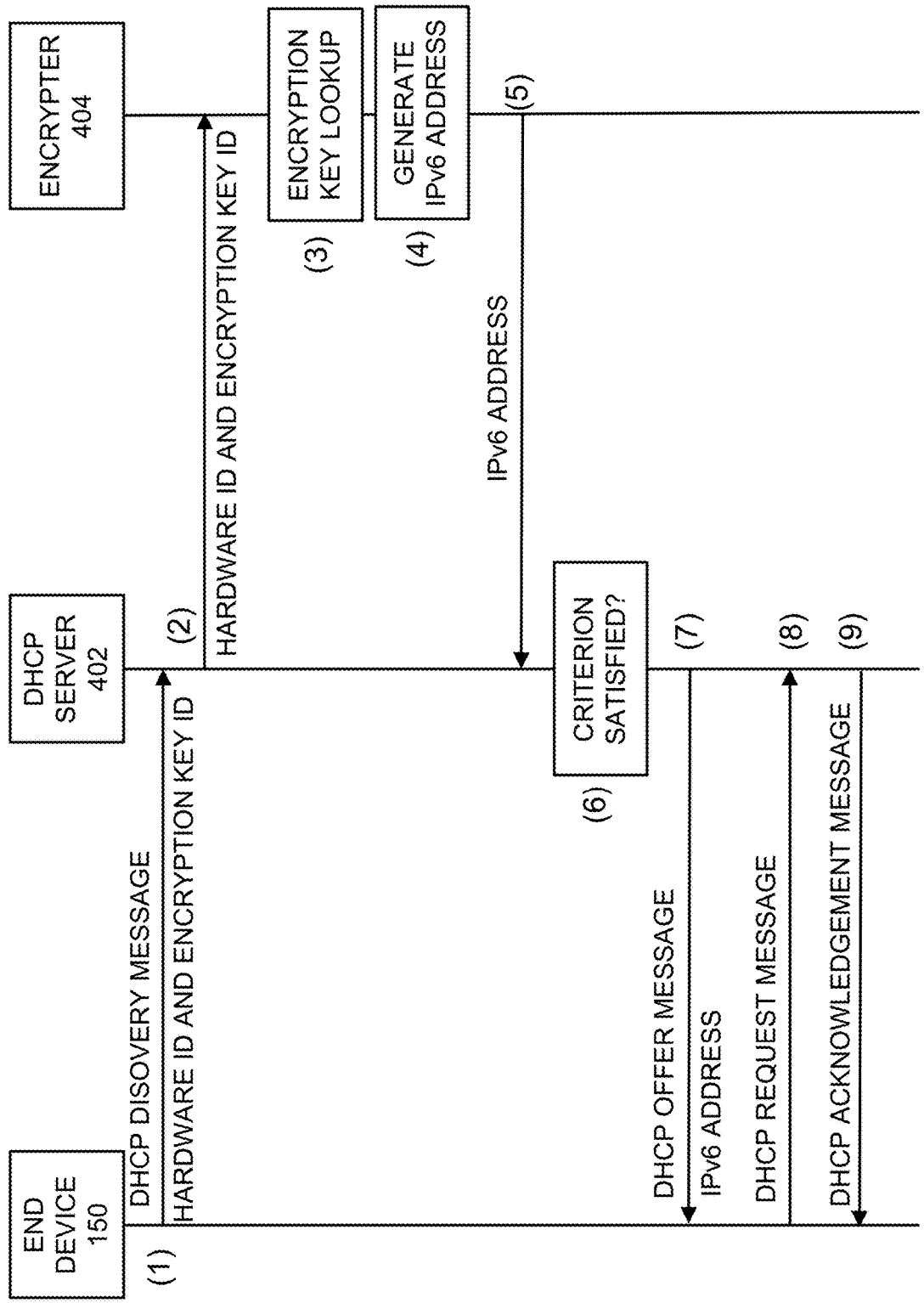
FIG. 4 is a diagram illustrating another exemplary process of an exemplary embodiment of the global identification service.

FIG. 4 is a diagram illustrating another exemplary process of the global identification service. According to an exemplary embodiment, device 110 includes a DHCP server 402 and an encrypter 404, which provide the global identification service. According to other exemplary embodiments, DHCP server 402 and encrypter 404 may reside on separate devices 110. The types of messages illustrated and described are exemplary. Additionally, depending on the implementation, the messages exchanged between DHCP server 402 and encrypter 404 may be via a communication link between devices, an inter-process communication (IPC) between functional elements residing on the same device 110, and so forth.

Referring to FIG. 4, according to an exemplary scenario, end device 150 generates and transmits a DHCP Discovery message to DHCP server 402. For example, in step (1), end device 150 may broadcast the DHCP Discovery message on a network. The DHCP Discovery message may include, for example, a discovery request for finding a DHCP server, an identifier of end device 150, and an encryption key identifier. The encryption key identifier may identify an encryption key. As previously described, end device 150 may store the encryption key identifier based on use of the verification and pre-assignment service.

Figure 3D:
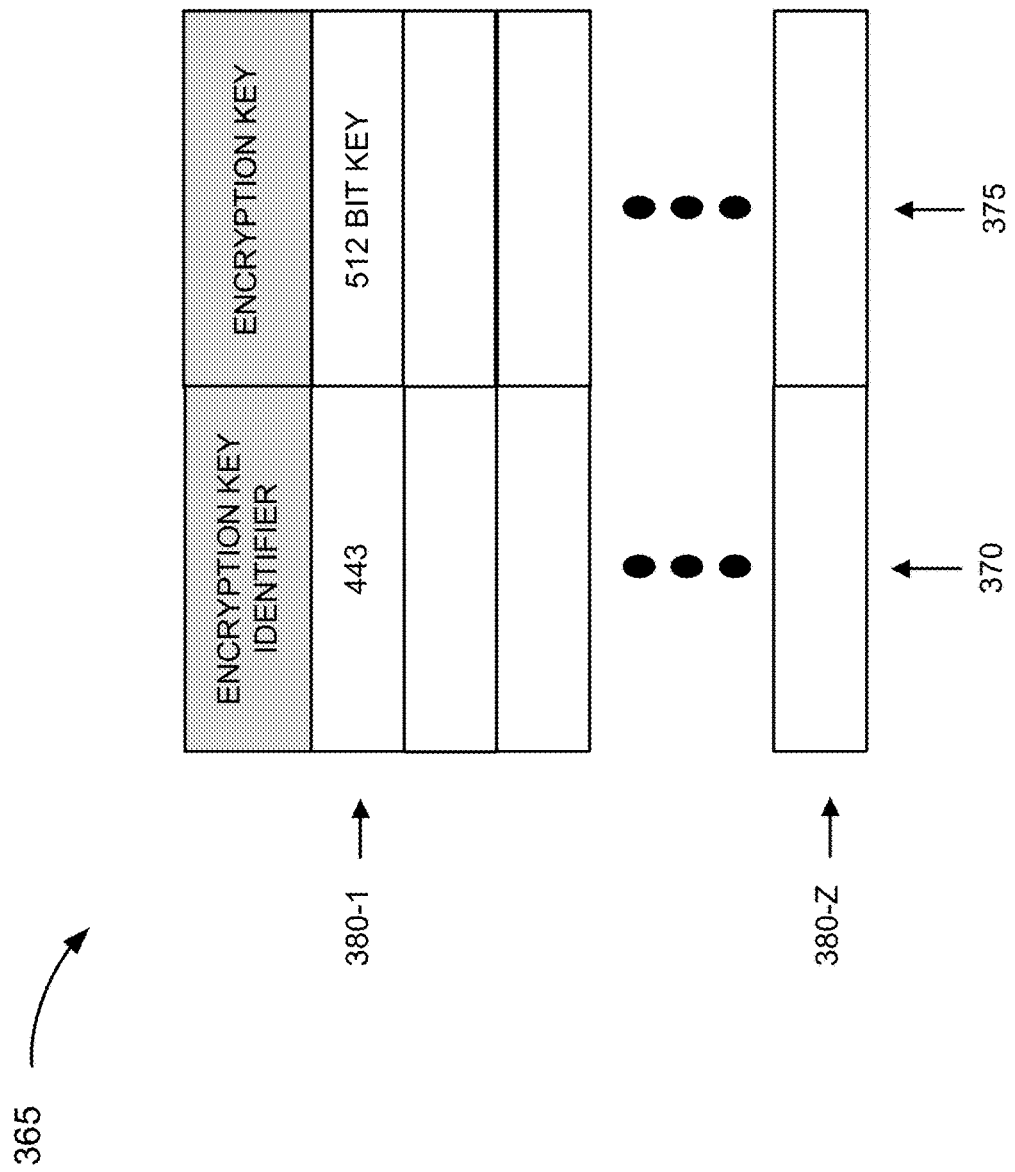

Subsequent to the transmission, the DHCP Discovery message may be received by DHCP server 402. In response, in step (2), DHCP server 402 may generate and transmit a request, which includes the identifier of end device 150 and the encryption key identifier, to encrypter 404. Subsequent to the transmission, encrypter 404 may receive the request. In step (3), in response, encrypter 404 may perform an encryption key look-up. For example, referring to FIG. 3D, encrypter 404 of device 110 may store global identification service information, which includes a correlation or a mapping between an encryption key identifier and an encryption key, in a table or other suitable data structure or a database. By way of further example, a table 365 includes an encryption key identifier field 370 and an encryption key field 375. As further illustrated, table 365 includes records 380-1 through 380-Z that each includes a grouping of fields 370 and 375 that may be correlated. The values included in fields 370 and 375 are exemplary. Encryption key identifier field 370 may store an identifier that identifies an encryption key. Encryption key field 375 may store an encryption key.

Referring back to FIG. 4, according to an exemplary implementation, encrypter 404 may query table 365 to determine if the encryption key identifier, which may be included in the request, matches an encryption key identifier value stored in encryption key identifier field 370. According to this exemplary scenario, assume that encrypter 404 determines that a match exists. In response, in step (4), encrypter 404 generates an IPv6 address using the correlated encryption key, which is stored in encryption key field 375 and the identifier of end device 150, which may be included in the request. For example, encrypter 404 encrypts the identifier using the encryption key to produce the IPv6 address. In response, encrypter 404 generates and transmits a response, which includes the IPv6 address, to DHCP server 402.

Subsequent to the transmission of the response, in step (5), DHCP server 402 receives the response. In step (6), DHCP server 402 determines whether the IPv6 address satisfies a criterion. For example, DHCP server 402 may determine whether IPv6 address is within a range of IPv6 addresses of a pool, or matches an IPv6 address stored in table 315, as previously described. According to other exemplary implementations, the verification process may be omitted. According to yet another exemplary implementation, the criterion may pertain to the format and/or other attribute of the IPv6 address. For example, the output from encrypter 404 may not yield an IPv6 address due to an error occurring. In this regard, DHCP server 402 may validate whether the output from the generation process yielded a valid IPv6 address. In step (7), in response to determining that the IPv6 address satisfies the criterion, DHCP server 402 generates and transmits a DHCP Offer message, which includes the IPv6 address, to end device 150.

Subsequent to the transmission of the DHCP Offer message, in step (8), end device 150 receives the DHCP Offer message. According to this exemplary scenario, end device 150 may accept the offer, and may transmit (e.g., broadcast) a DHCP Request message, to DHCP server 402. In step (9), in response to receiving the DHCP Request message, DHCP server 402 generates and transmits a DHCP Acknowledgement message to end device 150, in which DHCP server 402 accepts the DHCP Request.

According to another exemplary scenario, in response to determining that the IPv6 address does not satisfy the criterion, DHCP server 402 may select an available or unassigned IPv6 address from the pool of IPv6 addresses. DHCP server 402 generates and transmits a DHCP Offer message, which includes the selected IPv6 address, to end device 150. End device 150 and DHCP server 402 may exchange DHCP Request and Acknowledgement messages, as previously described.

Subsequent to the assignment of the IPv6 address, end device 150 may access and use a network (e.g., network 105) with use of the assigned IPv6 address. The network may use the IPv6 address to uniquely identify end device 150 for providing various services, assets, etc. In addition, the network may use the IPv6 for transport of messages to and from end device 150.

Although FIG. 4 illustrates an exemplary process of the global identification service, according to other exemplary embodiments, the process may include additional, different, and/or fewer steps, include additional, different, and/or fewer messages, and/or involve additional, different, and/or fewer network devices. Additionally, or alternatively, according to other exemplary embodiments, an operation or a step performed by DHCP server 402 may be performed by encrypter 404, or vice versa. For example, encrypter 404 may determine whether the criterion is satisfied instead of DHCP server 402. Additionally, or alternatively, according to other exemplary scenarios, end device 150 may decline the IPv6 address. For example, end device 150 may generate and transmit a DHCP Decline message to DHCP server 402. Thereafter, end device 150 may initiate the IP address assignment process again.

Figure 5:
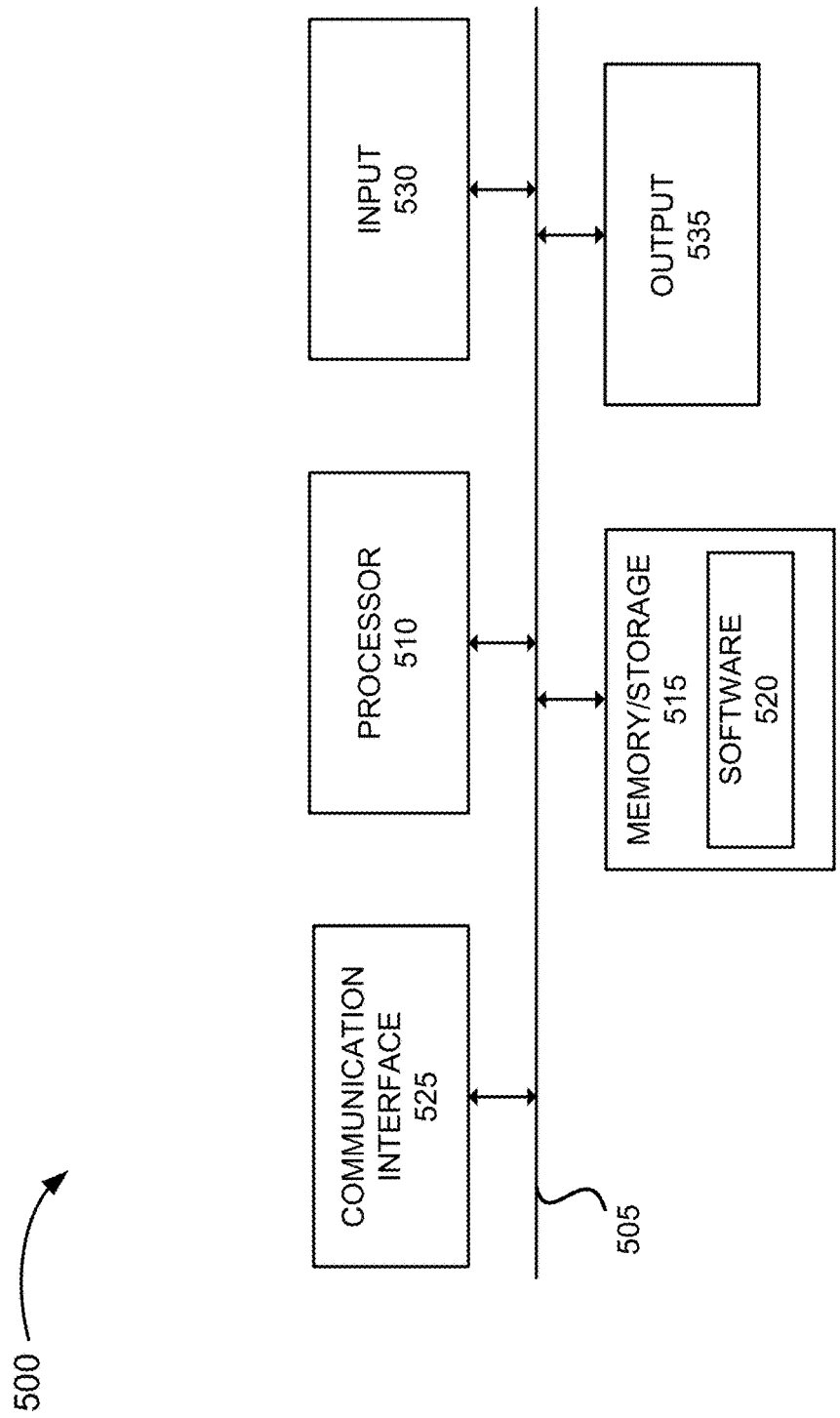
FIG. 5 is a diagram illustrating exemplary components of a device that may correspond to one or more of the devices illustrated and described herein.

FIG. 5 is a diagram illustrating exemplary components of a device 500 that may be included in one or more of the devices described herein. For example, device 500 may correspond to components included in device 110 and end device 150. As illustrated in FIG. 5, device 500 includes a bus 505, a processor 510, a memory/storage 515 that stores software 520, a communication interface 525, an input 530, and an output 535. According to other embodiments, device 500 may include fewer components, additional components, different components, and/or a different arrangement of components than those illustrated in FIG. 5 and described herein.

Bus 505 includes a path that permits communication among the components of device 500. For example, bus 505 may include a system bus, an address bus, a data bus, and/or a control bus. Bus 505 may also include bus drivers, bus arbiters, bus interfaces, clocks, and so forth.

Processor 510 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 510 may be implemented as hardware (e.g., a microprocessor, etc.), a combination of hardware and software (e.g., a SoC, an ASIC, etc.), may include one or multiple memories (e.g., cache, etc.), etc.

Processor 510 may control the overall operation or a portion of operation(s) performed by device 500. Processor 510 may perform one or multiple operations based on an operating system and/or various applications or computer programs (e.g., software 520). Processor 510 may access instructions from memory/storage 515, from other components of device 500, and/or from a source external to device 500 (e.g., a network, another device, etc.). Processor 510 may perform an operation and/or a process based on various techniques including, for example, multithreading, parallel processing, pipelining, interleaving, etc.

Memory/storage 515 includes one or multiple memories and/or one or multiple other types of storage mediums. For example, memory/storage 515 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 515 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 515 may include drives for reading from and writing to the storage medium.

Memory/storage 515 may be external to and/or removable from device 500, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 515 may store data, software, and/or instructions related to the operation of device 500.

Software 520 includes an application or a program that provides a function and/or a process. As an example, with reference to device 110, software 520 may include an application that, when executed by processor 510, provides the functions of the global identification service, as described herein. Additionally, with reference to end device 150, software 520 may include an application that, when executed by processor 510, provides the functions of the global identification service, as described herein. Software 520 may also include firmware, middleware, microcode, hardware description language (HDL), and/or other form of instruction. Software 520 may further include an operating system (OS) (e.g., Windows, Linux, Android, proprietary, etc.).

Communication interface 525 permits device 500 to communicate with other devices, networks, systems, and/or the like. Communication interface 525 includes one or multiple wireless interfaces and/or wired interfaces. For example, communication interface 525 may include one or multiple transmitters and receivers, or transceivers. Communication interface 525 may operate according to a protocol stack and a communication standard. Communication interface 525 may include an antenna. Communication interface 525 may include various processing logic or circuitry (e.g., multiplexing/de-multiplexing, filtering, amplifying, converting, error correction, application programming interface (API), etc.). Communication interface 525 may be implemented as a point-to-point interface, a service based interface, etc.

Input 530 permits an input into device 500. For example, input 530 may include a keyboard, a mouse, a display, a touchscreen, a touchless screen, a button, a switch, an input port, speech recognition logic, and/or some other type of visual, auditory, tactile, etc., input component. Output 535 permits an output from device 500. For example, output 535 may include a speaker, a display, a touchscreen, a touchless screen, a light, an output port, and/or some other type of visual, auditory, tactile, etc., output component.

As previously described, a device may be implemented according to various computing architectures (e.g., in a cloud, etc.) and according to various network architectures (e.g., a virtualized function, etc.). Device 500 may be implemented in the same manner. For example, device 500 may be instantiated, spun up, spun down, etc., using well-known virtualization techniques in a public/private cloud or other type of network.

Device 500 may perform a process and/or a function, as described herein, in response to processor 510 executing software 520 stored by memory/storage 515. By way of example, instructions may be read into memory/storage 515 from another memory/storage 515 (not shown) or read from another device (not shown) via communication interface 525. The instructions stored by memory/storage 515 cause processor 510 to perform a process described herein. Alternatively, for example, according to other implementations, device 500 performs a process described herein based on the execution of hardware (processor 510, etc.).

Figure 6:
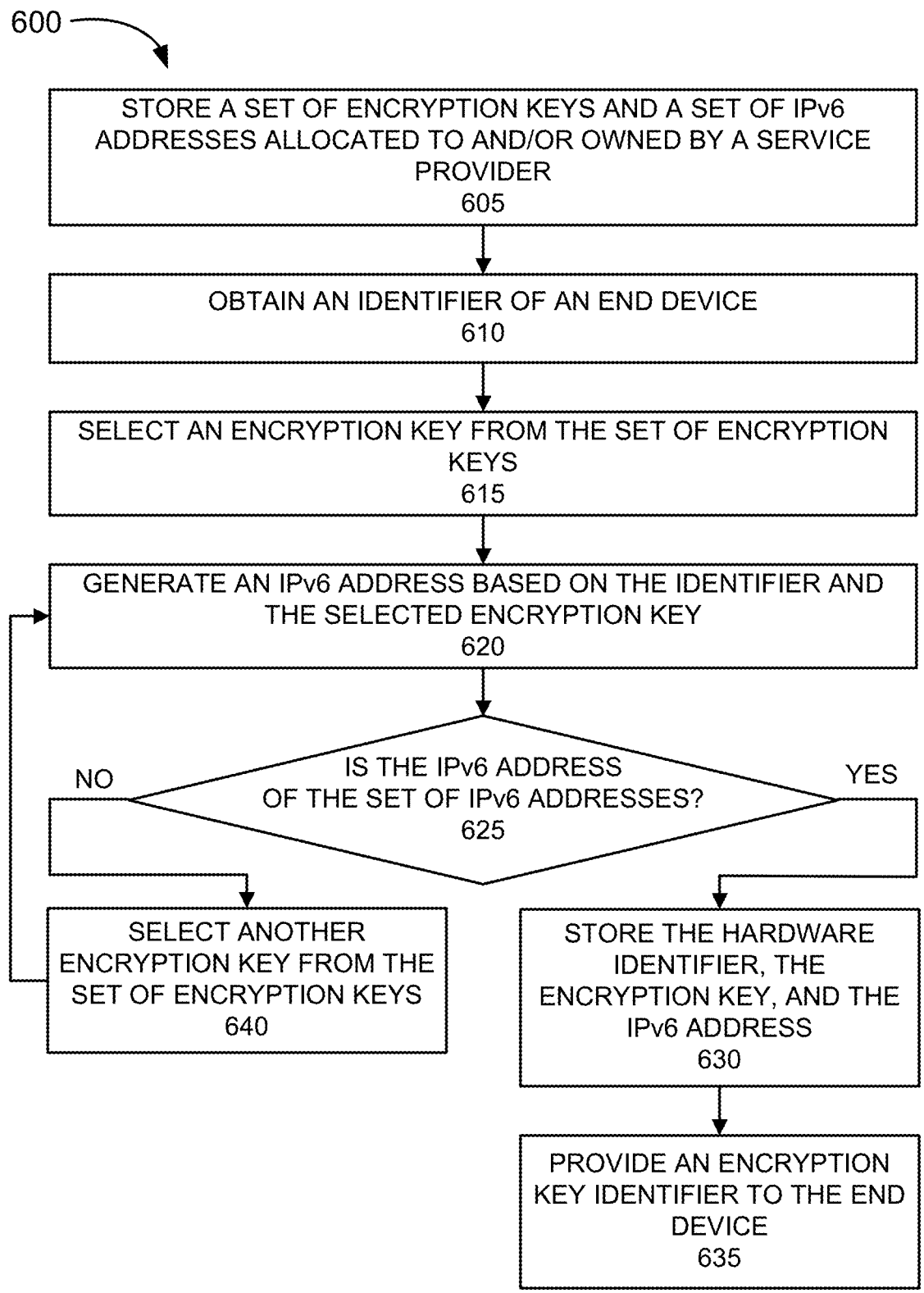
FIG. 6 is a flow diagram illustrating an exemplary process of an exemplary embodiment of the global identification service.

FIG. 6 is a flow diagram illustrating an exemplary process 600 of an exemplary embodiment of the global identification service. Process 600 is directed to a process previously described with respect to FIGS. 2A-2C, as well as elsewhere in this description, in which the global identification service is provided. According to an exemplary embodiment, device 110 performs steps of process 600. For example, processor 510 executes software 520 to perform the steps illustrated in FIG. 6, and described herein.

Referring to FIG. 6, in block 605, a set of encryption keys and a set of IPv6 addresses may be stored. For example, device 110 may store tables 300 and 315. The set of IPv6 addresses may be IPv6 addresses allocated to and/or owned by a service provider.

In block 610, an identifier of an end device may be obtained. For example, device 110 may obtain a hardware identifier or some other type of identifier from end device 150 or from another device.

In block 615, an encryption key from the set of encryption keys may be selected. For example, in response to obtaining the identifier, device 110 may select an encryption key from the set of encryption keys. The selection of the encryption key may be a random selection or a non-random selection.

In block 620, an IPv6 address may be generated based on the identifier and the selected encryption key. For example, device 110 may encrypt the hardware identifier using the selected encryption key to produce the IPv6 address.

In block 625, it is determined whether the IPv6 address is an IPv6 address of the set of IPv6 addresses. For example, device 110 may compare the IPv6 address to a range of IPv6 addresses associated with the set of IPv6 addresses. Device 110 may determine whether the IPv6 address is within the range based on the comparison. Alternatively, device 110 may compare the IPv6 address to the set of IPv6 address. Based on the comparison, device 110 may determine whether the IPv6 address matches one of the IPv6 addresses included in the set of IPv6 addresses. Device 110 may also determine whether the matched IPv6 address is available for pre-assignment. In this way, device 110 may verify that there is no collision with other IPv6 address pre-assignments previously made based on end device identifiers and encryption keys.

When it is determined that the IPv6 address satisfies the criterion (block 625—YES), the hardware identifier, the encryption key, and the IPv6 address may be stored (block 630). For example, device 110 selects and assigns the IPv6 address as a globally unique identifier for end device 150. Device 110 may store the global identification service information in table 335. For example, the IPv6 address may serve as both a network address and a globally unique identifier for end device 150 in the network. The network may use the assigned IPv6 address to globally identify end device 150 in the network when providing a service.

In block 635, an encryption key identifier may be provided to the end device. For example, device 110 may generate and/or select an encryption key identifier, which identifies the encryption key used during the generation of the IPv6 address. Device 110 may transmit the encryption key to end device 150 or make it available for retrieval by end device 150 or another device.

When it is determined that the IPv6 address is not an IPv6 address of the set of IPv6 addresses (block 625-NO), another encryption key may be selected from the set of encryption keys (block 640). Process 600 may return to block 620. For example, device 110 may generate another IPv6 address based on the hardware identifier and the other encryption key. As illustrated, process 600 may be iteratively performed until an IPv6 address is selected and assigned.

Although FIG. 6 illustrates an exemplary process 600 of the global identification service, according to other embodiments, process 600 may include additional operations, fewer operations, and/or different operations than those illustrated in FIG. 6, and described herein.

Figure 7:
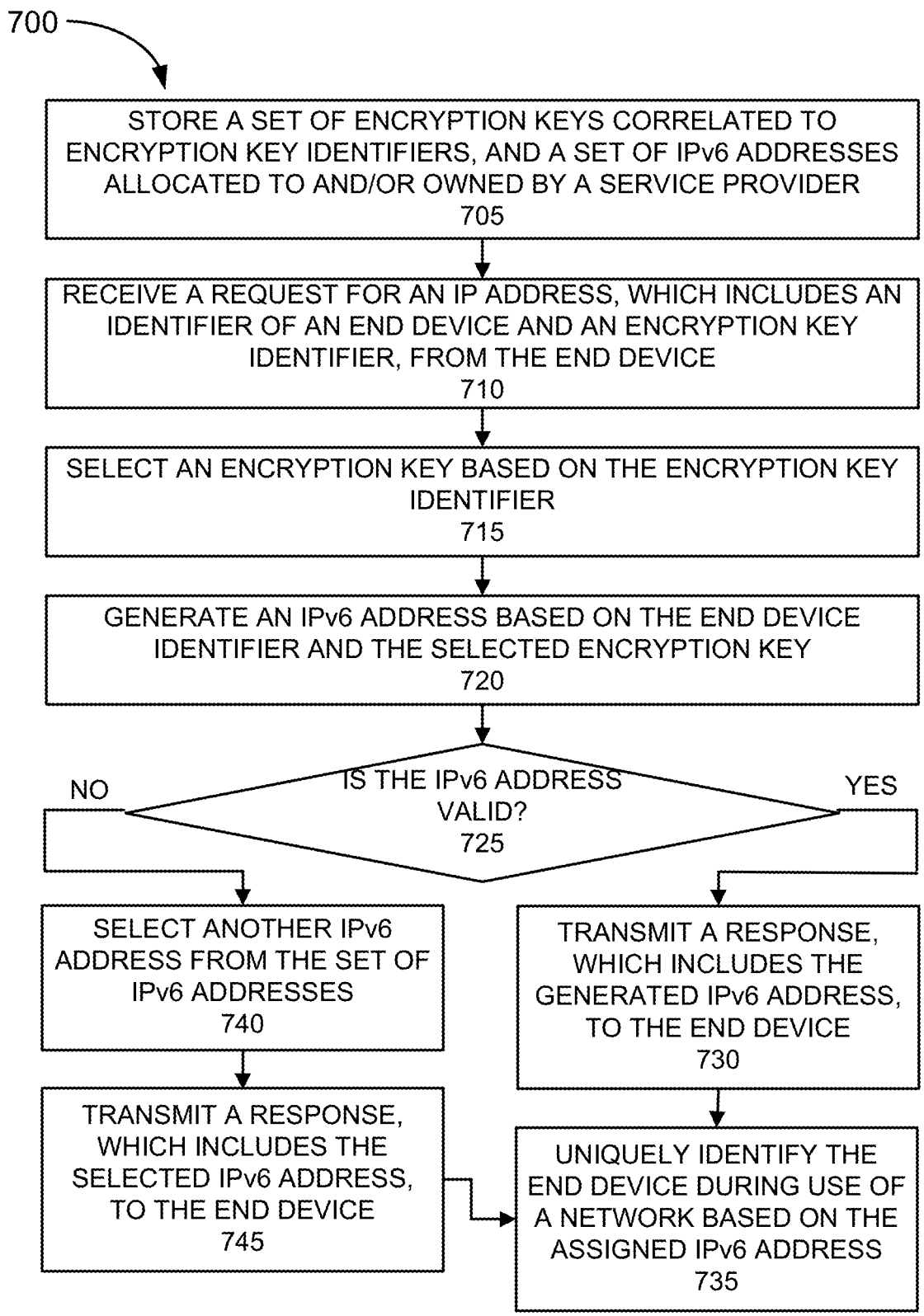
FIG. 7 is a flow diagram illustrating another exemplary process of an exemplary embodiment of the global identification service.

FIG. 7 is a flow diagram illustrating an exemplary process 700 of an exemplary embodiment of the global identification service. Process 700 is directed to a process previously described with respect to FIG. 7, as well as elsewhere in this description, in which the global identification service is provided. According to an exemplary embodiment, device 110 performs steps of process 700. For example, processor 510 executes software 520 to perform the steps illustrated in FIG. 7, and described herein.

Referring to FIG. 7, in block 705, a set of encryption keys correlated to encryption key identifiers, and a set of IPv6 addresses may be stored. For example, device 110 may store tables 365 and 315.

In block 710, a request for an IP address, which includes an identifier of an end device and an encryption key identifier, may be received from the end device. For example, device 110 may receive one or multiple messages from end device 150. By way of further example, a single message may carry the request, the identifier, and the encryption key identifier. According to another example, multiple messages may be received by device 110.

In block 715, an encryption key from the set of encryption keys may be selected. For example, in response to obtaining the encryption key identifier, device 110 may select an encryption key from table 365 based on the correlated encryption key identifier.

In block 720, an IPv6 address may be generated based on the identifier and the selected encryption key. For example, device 110 may encrypt the hardware identifier using the selected encryption key to produce the IPv6 address.

In block 725, it is determined whether the IPv6 address is valid. For example, device 110 may validate whether the output from the generation process yielded a valid IPv6 address. For example, the output from the encryption process may or may not yield an IPv6 address due to an error. Device 110 may detect whether there are any formatting errors or other type of errors that cause the IPv6 address to be invalid.

When it is determined that the IPv6 address is valid (block 725—YES), a response, which includes the generated IPv6 address, may be transmitted to the end device (block 730). For example, device 110 may generate a response, which includes the generated IPv6 address. Device 110 may transmit the response to end device 150.

In block 735, the end device may be uniquely identified during use of a network based on the assigned IPv6 address. For example, as previously described, various network-related functions and services of network 105 may use the IPv6 address as a globally unique identifier for end device 150 as well as for the transmission and reception of messages pertaining to end device 150.

When it is determined that the IPv6 address is not valid (block 725-NO), another IPv6 address may be selected (block 735). For example, device 110 may select another IPv6 address from the set of IPv6 addresses.

In block 740, the selected IPv6 address may be provided to the end device. For example, device 110 may generate a response, which includes the selected IPv6 address. Device 110 may transmit the response to end device 150. Subsequently, block 735 may be performed, as previously described.

Although FIG. 7 illustrates an exemplary process 700 of the global identification service, according to other embodiments, process 700 may include additional operations, fewer operations, and/or different operations than those illustrated in FIG. 7, and described herein. For example, according to other exemplary embodiments, block 725, 740, and 745 may be omitted.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 6 and 7, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 510, etc.), or a combination of hardware and software (e.g., software 520).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 510) of a device. A non-transitory storage medium includes one or more of the storage mediums described in relation to memory/storage 515.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method comprising:
    generating, by a device, a first Internet Protocol version 6 (IPv6) address using a hardware identifier of an end device and a first encryption key;
    determining, by the device, whether the first IPv6 address matches an IPv6 address of IPv6 addresses or is within a range of the IPv6 addresses, wherein the IPv6 addresses are a subset of and fewer than all possible IPv6 addresses;
    transmitting, by the device and to the end device, a first response that includes a first encryption key identifier that identifies the first encryption key when determining that the first IPv6 address matches the IPv6 address of the IPv6 addresses or is within the range of the IPv6 addresses; and
    iteratively generating a second IPv6 address and determining whether the second IPv6 address matches the IPv6 address or is within the range of the IPv6 addresses, by the device, until the second IPv6 address is determined to match the IPv6 address of the IPv6 addresses or is within the range of the IPv6 addresses when determining that the first IPv6 address does not match the IPv6 address of the IPv6 addresses or is not within the range of the IPv6 addresses.

2. The method of claim 1, further comprising:
    transmitting, by the device and to the end device, a second response that includes a second encryption key identifier that identifies a second encryption key used to generate the second IPv6 address.

3. The method of claim 1, further comprising:
    selecting, by the device, the first encryption key from encryption keys.

4. The method of claim 1, wherein the IPv6 addresses are at least one of allocated to or owned by a service provider.

5. The method of claim 1, further comprising:
    storing, by the device, the first encryption key, the first encryption key identifier, and the first IPv6 address.

6. The method of claim 1, further comprising:
    determining, by the device, whether the first IPv6 address generated based on the first encryption key includes an error.

7. The method of claim 1, wherein generating the first IPv6 address using the hardware identifier and the first encryption key comprises:
    encrypting, by the device, the hardware identifier using the first encryption key.

8. The method of claim 1, wherein the hardware identifier is a media access control (MAC) address.

9. A network device comprising:
    a processor configured to:
        generate a first Internet Protocol version 6 (IPv6) address using a hardware identifier of an end device and a first encryption key;
        determine whether the first IPv6 address matches an IPv6 address of IPv6 addresses or is within a range of the IPv6 addresses, wherein the IPv6 addresses is a subset of and fewer than all possible IPv6 addresses;
        transmit to the end device, a first response that includes a first encryption key identifier that identifies the first encryption key when a determination that the first IPv6 address matches the IPv6 address of the IPv6 addresses or is within the range of the IPv6 addresses; and
        iteratively generate a second IPv6 address and determine whether the second IPv6 address matches the IPv6 address or is within the range of the IPv6 addresses, until the second IPv6 address is determined to match the IPv6 address of the IPv6 addresses or is within the range of the IPv6 addresses when a determination that the first IPv6 address does not match the IPv6 address of the IPv6 addresses or is not within the range of the IPv6 addresses.

10. The network device of claim 9, wherein the processor is further configured to:
    transmit to the end device, a second response that includes a second encryption key identifier that identifies a second encryption key used to generate the second IPv6 address.

11. The network device of claim 9, wherein the processor is further configured to:
    select the first encryption key from encryption keys.

12. The network device of claim 9, wherein the IPv6 addresses are at least one of allocated to or owned by a service provider.

13. The network device of claim 9, wherein the processor is further configured to:
    store the first encryption key, the first encryption key identifier, and the first IPv6 address.

14. The network device of claim 9, wherein the processor is further configured to:
    determine whether the first IPv6 address generated based on the first encryption key includes an error.

15. The network device of claim 9, wherein the hardware identifier is a media access control (MAC) address.

16. The network device of claim 9, wherein, when generating, the processor is further configured to:
    encrypt the hardware identifier using the first encryption key.

17. A non-transitory, computer-readable storage medium storing instructions executable by a processor of a device, which when executed cause the device to:
    generate a first Internet Protocol version 6 (IPv6) address using a hardware identifier of an end device and a first encryption key;
    determine whether the first IPv6 address matches an IPv6 address of IPv6 addresses or is within a range of the IPv6 addresses, wherein the IPv6 addresses are a subset of and fewer than all possible IPv6 addresses;
    transmit to the end device, a first response that includes a first encryption key identifier that identifies the first encryption key when a determination that the first IPv6 address matches the IPv6 address of the IPv6 addresses or is within the range of the IPv6 addresses; and
    iteratively generate a second IPv6 address and determine whether the second IPv6 address matches the IPv6 address or is within the range of the IPv6 addresses, until the second IPv6 address is determined to match the IPv6 address of the IPv6 addresses or is within range of the IPv6 addresses when a determination that the first IPv6 address does not match the IPv6 address of the IPv6 addresses or is not within the range of the IPv6 addresses.

18. The non-transitory, computer-readable storage medium of claim 17, wherein the IPv6 addresses are at least one of allocated to or owned by a service provider.

19. The non-transitory, computer-readable storage medium of claim 17, wherein the instructions, which when executed cause the device to:
   transmit to the end device, a second response that includes a second encryption key identifier that identifies a second encryption key used to generate the second IPv6 address.

20. The non-transitory, computer-readable storage medium of claim 17, wherein the hardware identifier is a media access control (MAC) address.

* * * * *